Patented Oct. 27, 1942

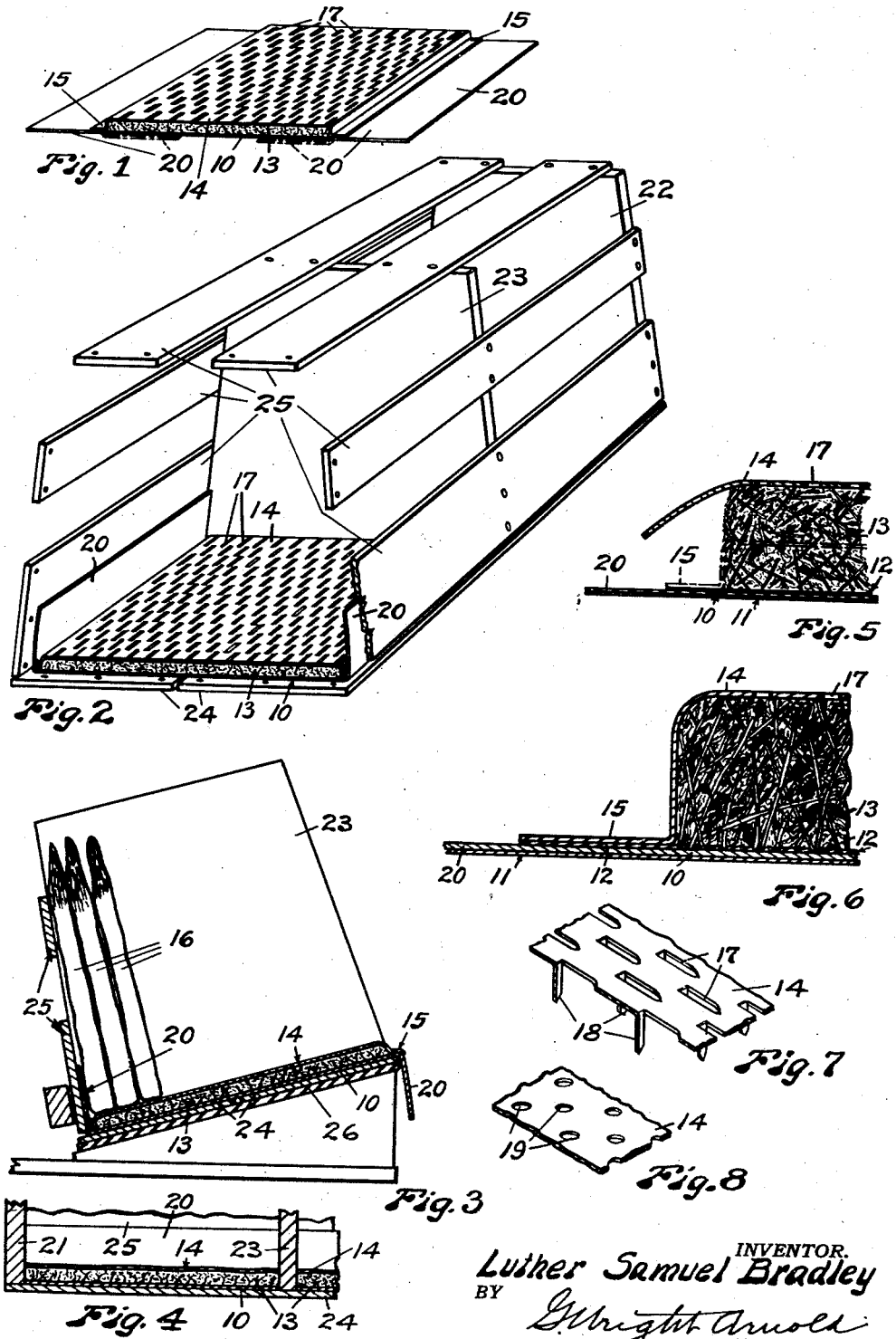

2,300,041

UNITED STATES PATENT OFFICE 2,300,041

METHOD OF MAKING MOISTURE SUPPLYING SHIPPING PADS AND THE PRODUCTS THEREOF

Luther Samuel Bradley, Deming, Wash.

Application March 25, 1940, Serial No. 325,805

13 Claims. (Cl. 47—38)

My invention relates to a moisture supplying shipping pad for vegetables and to the method of making the same. More particularly my invention relates to a shipping pad characterized by its economical construction, lightness of weight, capacity for supplying a controlled amount of moisture, and having such stiffness that even when wet it will support the weight of the vegetables bearing directly thereon without objectionably reducing the required amount of moisture to be retained by the pad.

The food value of vegetables depends largely upon freshness, and many, after becoming dried out during shipment, may be refreshened by water, but asparagus is peculiar in that once becoming partially dried it does not readily reabsorb moisture and recover its freshness. Loss of weight is costly to the grower and at the same time the consumer loses by reason of the product having a poor flavor and less nutritive value.

For purposes of definiteness of disclosure and clearness of description, I will set forth my invention as relates to the shipment of asparagus, but it will be understood that it is not limited to any such specific use, but is applicable to all cases where like problems are involved, either in whole or in part.

Asparagus continues growing during shipment when moisture is supplied to the base of the stalks, and by thus keeping the same growing it may be delivered fresh to the consumer after a shipping period occupying days. The pad of my invention provides for so supplying the moisture. This growth amounts to one to two inches in length or an increase of one to four pounds and this increase in value substantially equals the transportation charges. It is not merely a matter of maintaining the asparagus in a moist atmosphere or subjecting it to vaporized moisture in a closed or confined compartment, but is a matter of supplying an adequate and controlled amount of moisture to the cut ends of the asparagus stalks.

A shipping crate is required to be of light slat construction to keep charges to a minimum, to prevent mold, and to permit the asparagus to grow. Such airable crate complicates the problem as the moisture readily escapes and a larger initial supply is required. While growth of the asparagus is desirable, too much growth will cause the same to become tough and will cause the tips to extend above the top slats so that they are liable to become broken. From the conditions set forth, manifestly the amount of absorbent material must be substantially uniform in the pads to provide uniformity in the amount of moisture. Provision is made in the method of making the pad of my invention to provide for such uniformity.

Green tree moss has been found objectionable because it tends to mold, develop heat and fails to hold moisture very long. Also sheets of cellulose pulp of a blotter-like character have been tried but do not work out in practical operation, fail to hold a sufficient quantity of water and are too expensive. As opposed to these materials, sphagnum moss, I have discovered, when formed into the pad of my invention, has the advantages herein set forth.

Particularly must the pad be of a character that it can be readily handled, quickly positioned in the container, and quickly supplied with the necessary quantity of moisture in a relatively short time to permit its use in line production packing with an endless traveling conveyor.

Asparagus crates have generally a double compartment. One of the objects of my invention is to transform the base portion of the crate by means of the pad which I provide into a regulated moisture supplying reservoir, as well as a proper support for the asparagus. The high speed involved in the manufacture of wooden crates results in considerable irregularity in length of the compartments, which creates a problem in the providing of a pad which can be readily put in position. The pad must be somewhat smaller than the compartment and at the same time looseness must be eliminated if the pad is to form a moisture reservoir. In other words, the pad must seal tight the bottom of compartments of irregular length. Accordingly, I provide a pad which may be readily placed in position and at the same time functions to make a moisture seal on all four edges and thereby provide for converting the bottom of the compartment into a moisture supplying reservoir as it were, even though the compartments involve irregularities as to dimensions. I accomplish this sealing operation by providing a pad with the absorbent material exposed on the ends of the pad and yet provided with means for preventing the moss material from escaping from this open edge of the pad so that the absorbent material will swell or expand and make a seal which thereby confines the water.

Since the moisture pad must function both as a moisture supplying reservoir and as a support for the weight of the asparagus, the double problem arises of (a) providing a pad which will hold the required quantity of moisture and one which will absorb the moisture in a sufficiently quick period of time, and (b) providing a pad which while formed of water absorbent material will have such a degree of stiffness, even when softened by being saturated with water, as to support the weight of the asparagus and not become prematurely packed down by such weight to such an extent as to have the moisture squeezed out.

Also the providing of such a pad must be characterized by its economical construction as well as lightness of weight so as not to add materially to the cost of the article shipped or augment the shipping cost. Moreover, while the cut ends of the asparagus must be supplied with moisture, at the same time the asparagus upon being removed for sale must be clean as to the end portions of the stalk, i. e., free of all objectionable adhering particles of moss.

A primary purpose of my invention is to provide a moisture supplying shipping pad which meets the various requirements set forth above.

The above mentioned general objects of my invention, together with others inherent in the same, are attained by the device illustrated in the following drawing, the same being preferred exemplary forms of embodiment of my invention, throughout which drawing like reference numerals indicate like parts:

Figure 1 is a view in perspective of a shipping pad embodying my invention;

Fig. 2 is a perspective view showing an open airable double compartment crate commonly employed in shipping asparagus with an end thereof removed to show a pad embodying my invention in position, a fragment of the crate being broken away;

Fig. 3 is a cross section of the crate, with the side and top slats removed, in tilted position on the carrier belt, in which position it is packed with asparagus;

Fig. 4 is a fragmentary view in longitudinal cross section through a crate compartment and through the pad, showing that the pad at the end portions where the absorbent material is exposed forms a tight fitting joint;

Fig. 5 is a fragmentary view in cross section of the pad in process of construction, i. e., showing by full lines the perforated cover sheet positioned on the loose absorbent material and showing by dot and dash lines the position of said cover sheet after the loose material has been compressed and the marginal portions of the cover sheet secured to a base sheet;

Fig. 6 is an enlarged fragmentary view in cross section of a pad showing the pieces of sphagnum moss embedded in a layer of glue or cement on the base sheet and thus secured to the base sheet;

Fig. 7 is a fragmentary perspective view of the cover sheet showing the staggered position and preferable slot like form of perforations; and Fig. 8 shows a modified form of perforated cover sheet provided with round apertures.

The pad shown in the accompanying drawing comprises a water resistant base member formed of a sheet of paper 10 having a coating 11 of water resistant material, such as wax, on the bottom portion thereof and having a coating 12 of water resistant adhesive material, such as water resistant glue, on the top surface thereof covering the medial portion of the sheet and preferably terminating a short distance from the edges of said sheet.

A layer of water absorbent material 13 is disposed medially of the bottom sheet 10 on the glue 12 with portions of the water absorbent material adjacent the sheet 10 embedded in and adhered to the glue.

A cover sheet 14 is positioned over the absorbent material and the edge portions 15 of said cover sheet are secured to the bottom sheet 10 at the sides of the layer 13 of absorbent material. Preferably these edge portions 15 are adhesively secured to base member 10 by pressing them firmly against the glue layer 12.

For the bottom sheet 10 I find it satisfactory to use a substantial kraft paper and for the cover sheet 14 parchment paper. The water absorbent material is preferably sphagnum moss. The wet moss undecomposed but dead is dug from a drained bog located near Deming, Washington, in blocks of about fourteen inches square by four inches thick and is dried. The term "sphagnum moss" as used herein refers to such undecomposed but dead sphagnum moss. Then these blocks are put through a shredding machine which pulls the block apart and shreds the material only to a small extent. The moss has stems varying from about ¼ inch in length to about an inch in length and to the stems is still attached a large proportion of the short fern-like leaves and at the same time there is a considerable portion of the leaves which have become detached from the stems and in the form of small particles becomes enmeshed with the stems. In short, the stems provide an interlaced mesh work, the interstices of which are filled with the leaves, either attached or detached (see Figs. 5 and 6). Some of these stem-like pieces of varying length become adherently secured to the glue layer 12 and extend upwardly at various angles through the water absorbent mass and serve the triple purpose of cushion members, water conductive wick members, and securing or anchoring means for the water absorbent mass.

The stems of the moss in the water absorbent material, even when saturated with water, have some stiffness as well as resiliency and support the weight of the asparagus and also help to prevent the water absorbent material from being compressed into a solid mass with a consequent loss of water. At the same time these stems act like wicks in helping to promote an upward movement of the water. Also, because some of these stems are adherently secured in the glue layer 12, they help to hold the body of water absorbent material in place, especially at the open ends of the pads where the shredded material might otherwise tend to shatter out.

The part of the cover sheet 14 that is positioned on the top portion of the shredded material 13 is perforated so that the pad will absorb water quickly and easily and so that this water will be given off gradually to the severed end portions of stalks of asparagus 16 that rest on said pad, as shown in Fig. 3. The perforations in sheet 14 may be in the form of slots 17 with downwardly punched tabs 18 as shown in Figs. 1 to 7 or these perforations may be holes 19 as shown in Fig. 8. In both instances these perforations are well distributed over the paper and, if they are in rows, the perforations of adjacent rows are preferably offset. In the case of the slots 17 the punched portions 18 are folded back and pressed as shown in dotted line, Figs. 5, 6 and 7, so that they also serve to retain the shredded material against shattering out at the exposed ends. The slotted form 17 is preferable because it opens up and exposes a larger area of the moss so that it can more readily receive the necessary quantity of water in the minimum period of time.

The functions of the cover sheet 14 are to retain the water absorbent material to provide for shipping and handling; to permit a free passage of water either into or out of the water absorbent material; and to prevent the water absorbent material from adhering to the stalks of asparagus, and to regulate or control the escape of the water to the cut ends of the asparagus. By this construction, the water will have to travel laterally to escape through the slot openings.

In constructing my moisture supplying shipping pads, I deposit the glue layer 12 on the bottom sheet 10. While this glue layer 10 is still tacky I deposit thereon a layer of shredded material 12 of approximately twice the thickness of the finished pad, as shown by full lines in Fig. 5. The perforated cover sheet 14 is then placed on the loose layer of water absorbent material 12 with the edges 14 overhanging as shown by full lines in Fig. 5. The cover sheet is then pressed down to a position approximately as shown by dot and dash lines in Fig. 5 to compress the water absorbent material to about one-half its original thickness and to secure the edges 14 of the cover sheet 12 to the bottom sheet 14. I have produced satisfactory moisture supplying pads by taking a loose layer of sphagnum moss about seven-eighths of an inch thick and compressing it to about three-eighths of an inch in thickness.

The layer of wax 11 may be applied to sheet 10 either before or after or at the same time as the glue.

The shredded water absorbent material in a compressed condition as above described will expand to about double its thickness when water is supplied to it and will take up the water very rapidly. It will absorb a large amount of water in proportion to its own volume and will give this water off at the correct rate to keep the asparagus in a healthy growing condition over the maximum period of time that the asparagus will ordinarily be left in the crate.

The edge portions 20 of the bottom sheet extend beyond the water absorbent material far enough to form wing members or turned up flaps which help to provide a water retaining reservoir along the sides in the bottom portion of an otherwise open work crate. These flaps or wing edge portions 20 also serve to prevent air from entering along the bottom edge of the bottom slat, and thus limit the evaporation to this extent. This is very important because it conserves greatly the water in the pad.

The crate, shown in Figs. 2, 3 and 4, is of well known construction. It comprises two end members 21 and 22, a medial partition member 23 dividing the crate into two compartments, bottom boards 24 and slats 25 spaced apart to provide a free circulation of air and forming the sides and top portion of the crate. This crate is narrower at the top than at the bottom and each moisture supplying shipping pad is of the proper dimensions to snugly fit the bottom portion of one compartment of the crate with the end portions of the pad pressed firmly against one end member and the medial partition member 23 of the crate.

As previously mentioned, the manufacture of the crates is performed at such a high speed that the dimensions of the base of the compartments of the crate are not uniform. Accordingly, this presents the difficulty of providing a pad which must be of a dimension which may be readily placed in position for in-line production in packing. At the same time the pad must be of a dimension, as explained above, to form a watertight seal against the escape of the water at the ends of the pad. This difficulty I met and solved by providing a pad which has the moss exposed and uncovered at the end portion so that even then when placed in the crate, the end of the pad does not abut tightly against the end members 21 and 23 of the compartment. Nevertheless, when moisture is applied to the pad the shredded absorbent material will be caused to expand and form a water-tight seal. As already explained, having the end of the pad thus open to function in this manner presented the difficulty of providing a pad which would not have the exposed moss shatter out and break away on the end portions. Having the bottom end portions of the stems embedded in the glue layer 12 operates to retain the absorbent material in the pad and form a square faced end for the absorbent material.

At the time these moisture supplying shipping pads are manufactured, the edge portions 20 thereof are preferably folded inwardly against the bottom side of the sheet 10, as shown by dot and dash lines in Fig. 1. This fold or bend is made where the portions 14 overlap the portions 20 and thus provides a fold in two layers of paper. When the pads are placed in the crates these edge portions 20 are reversely folded along the lines of the former folds so that they extend upwardly within the crates and cooperate in forming water reservoirs in the lower portions of the crates. When the edge portions 20 are thus folded upwardly, they will have a greater tendency to spring outwardly against the sides of the crates because of their previously having been folded inwardly along lines where the sheets 10 and 14 are overlapped. This tendence to spring outwardly is augmented by the two sheet construction along the folding line.

The packing of the crates is usually done before the top portion and one side portion of each crate is applied and while the crates are supported in an inclined position and are being moved by traveling conveyor means 26, see Fig. 3.

The process of packing includes placing the moisture supplying shipping pads in the compartments of the crates with one wing member 20 of each pad against the back wall of the crate and the other wing member 20 hanging downwardly over the front edge portion of the crate bottom. It will be noted that the folding back also keeps this wing member tending to spring outwardly and in this case even downwardly as the side slat is not as yet in place.

The supplying of water to the pads may be accomplished in different ways—one of two methods being commonly employed. The first of these is as follows: After the dry pad is put in place, the conveyor belt with the crate is allowed to pass under a sprinkling system and the water is then caused to run down through the perforations or slot members 17, as well as upon the exposed ends so that the absorbent material is saturated with water. The fact that the moss has been pressed down makes it possible to saturate the layer of moss in a period of six minutes; to supply the same moss in loose form and occupying about seventh-eights of an inch in thickness would take a plurality of times longer, even as much as twenty-four minutes. The compressed moss may be explained as providing for prompt capillary action of the water to be drawn up along the sides of the stems and thereby provide ample water taken up by the inside tubular character of the stems. In other words, the compactness of the absorbent material may be said to provide for capillary action along the outside of the stems as well as the inside of the stems. Another possible explanation is that the expansion of the compressed material tends to form a vacuum which sucks in the moisture.

When the pad is saturated the asparagus is placed with its cut ends against the cover sheet 14 until the compartment is filled. Then an operator applies the side slat, being careful to fold the flap or fold 20 upwardly so as to have it bear against the side slat as the opposing flap already bears against the opposing slat, i. e., the slat on the opposite side of the crate. The rest of the slats and the top slats are next secured in position.

A second way of supplying the moisture is as follows: The dry pad is put in position in the compartment and the asparagus packed with the cut ends bearing against cover sheet 14 and the side slat is next secured with the flap or wing 20 bearing against the inside thereof, as above explained. The rest of the slats, that is for the side and the top, are next put in place. Thereupon the entire box is caused to be conveyed through a trough of water which rises well up towards the top of the asparagus. The entire crate is thus exposed to the water for a period of time necessary to saturate the pad. Any jolting action occurring in transit will tend to vibrate the water absorbent material up and down and will thus facilitate the upward feed of water.

Obviously each pad cooperates with the compartment of the crate in which it is placed to form a water storage reservoir in the bottom portion of a crate of generally open construction which would not otherwise retain water. Also it will be noted that the cover sheet 14 with its slots or perforations operates to control the escape of the moisture and provide thereby a controlled water supply reservoir for the compartment of the crate.

It will be understood that all of the crates do not have two compartments, as described herein. Some shipping crates for asparagus have but a single compartment but somewhat larger than where the crate is formed with two compartments. Also it will be understood that the two compartment crates sometimes omit the middle partition so that varying sizes of pads will obviously be necessary to meet these varying requirements. However, it is found by experiment that a pad, which has a layer of loose material 13 of about seven-eighths of an inch to an inch in thickness and has this compressed to about one-half its loose form condition, will, when saturated, supply the required amount of water to provide a satisfactory growth of the asparagus and to provide for maintaining the same in fresh condition during the ordinary time required in shipping the same from the Pacific coast growing areas until marketed along the Atlantic coast.

I claim:

1. A moisture supplying shipping pad formed of a water resistant base member; a water absorbent material layer disposed on said base member and spaced inwardly from two opposite edges of the base member to leave two wing members extending along two opposite side portions of said pad; and a perforated cover member positioned over said water absorbent material and secured to said two wing members.

2. A moisture supplying shipping container of the character described including a crate; and a moisture supplying pad formed of a water resistant base member, a water resistant glue layer disposed centrally on the upper face of said base member, leaving unglued marginal portions, a water absorbent material layer disposed centrally of said glue layer and with its lower portion embedded and held fast in said glue layer, said material layer being of an area which completely covers the inside bottom surface of the crate, said marginal portions forming wing members to extend upwardly against the side walls of said crate, and a perforated water resistant cover means for said absorbent material having two of its marginal portions held fast by the marginal portions of said glue layer.

3. A moisture supplying shipping container of the character described including a crate; and a moisture supplying pad formed of a water resistant base member, a water resistant glue layer disposed centrally on the upper face of said base member, leaving unglued marginal portions, a shredded sphagnum moss layer disposed centrally of said glue layer and with its lower portion embedded and held fast in said glue layer, said moss layer being of an area which completely covers the inside bottom surface of the crate, said marginal portions forming wing members to extend upwardly against the side walls of said crate, and a perforated water resistant cover means for said absorbent material having two of its marginal portions held fast by the marginal portions of said glue layer.

4. A moisture supplying shipping container of the character described including a crate; and a moisture supplying pad formed of a water resistant base member, a water resistant glue layer disposed centrally on the upper face of said base member, leaving unglued marginal portions, a compressed shredded sphagnum moss layer disposed centrally of said glue layer and with its lower portion embedded and held fast in said glue layer, said moss layer being of an area which completely covers the inside bottom surface of the crate, said marginal portions forming wing members extending upwardly against the side walls of said crate, and a perforated water resistant cover means for said absorbent material having two of its marginal portions held fast by the marginal portions of said glue layer.

5. A moisture supplying shipping pad comprising a paper base sheet; a water resistant layer on the bottom side of said base sheet; a water resistant layer on the top side of said base sheet; a layer of water absorbent material disposed on the water resistant layer on the top of said base sheet and spaced from the edges of said base sheet to leave foldable wing members along two opposite edge portions of said pad; and a paper cover sheet extending over said water absorbent material and secured to said wing members, said cover sheet having perforations in the portion thereof overlying said water absorbent material.

6. A moisture supplying shipping pad comprising a water resistant base member; a water absorbent material layer disposed on said base member and spaced inwardly from two opposite edges of the base member to provide two wing members extending along two opposite edge portions of said pad; a perforated cover member extending over said water absorbent material and having two of its edge portions overlapping and secured to said two wing members; and folds in the overlapped portions of said base member and said cover member predisposing said wing members to stand outwardly against the sides of a crate when said pad is placed in a crate with the wing members extending upwardly.

7. A moisture supplying shipping pad comprising a water resistant base member; water resistant adhesive material on said base member; shredded sphagnum moss disposed on said base member with portions thereof adherently secured in said adhesive material, said moss having a multiplicity of relatively long stems therein adherently secured in said adhesive and extending upwardly at various angles providing resilient supporting means and water conducting means; and a water transmitting cover sheet disposed over said sphagnum moss and secured to said base member.

8. The method of making a shipping pad comprising providing a sheet of material as a base member with an adhesive layer; disposing a layer of absorbent material with stiffening members therein upon said adhesive layer before the latter becomes set; and securing to two marginal portions of said base member a retaining sheet over said layer of said absorbent material.

9. The method of making a shipping pad comprising providing a sheet of material as a base member with an adhesive layer; disposing a layer of sphagnum moss upon said adhesive layer before the latter becomes set; and securing a retainer sheet over said layer of moss by causing its lateral edge portions to contact said adhesive layer.

10. The method of making a shipping pad comprising providing a sheet of material as a base member with an adhesive layer; disposing a layer of shredded sphagnum moss upon said adhesive layer before the latter becomes set; securing a retainer sheet over said layer of moss by causing its lateral edge portions to contact said adhesive layer; and subjecting said moss to compression to render the same compact.

11. A shipping pad having a sheet of material as a base member; a layer of adhesive disposed upon said base member; absorbent material having stiffening members disposed on said adhesive with portions thereof held therein; and cover means for said absorbent material secured along two of its marginal portions to said base member.

12. A shipping pad having a sheet of material as a base member; a layer of adhesive disposed upon said base member; absorbent material having stiffening members disposed on said adhesive with portions thereof held therein; a cover means for said absorbent material secured along two of its marginal portions to said base member and positioned in spaced relation to said base member along its other two marginal portions and with the absorbent material exposed along said other two marginal portions, whereby said absorbent material is held within said pad when dry and permitted to expand when wetted with water to form a seal and moisture supplying reservoir at the bottom of a compartment.

13. A shipping pad having a sheet of material as a base member; a layer of adhesive disposed upon said base member; sphagnum moss having portions thereof embedded and held fast in said adhesive; and cover means for said moss secured along two of its marginal portions to said base member.

LUTHER SAMUEL BRADLEY.